Feb. 17, 1942.   D. N. ROUNDY   2,273,221
LAWN MOWER ATTACHMENT
Filed Aug. 4, 1940
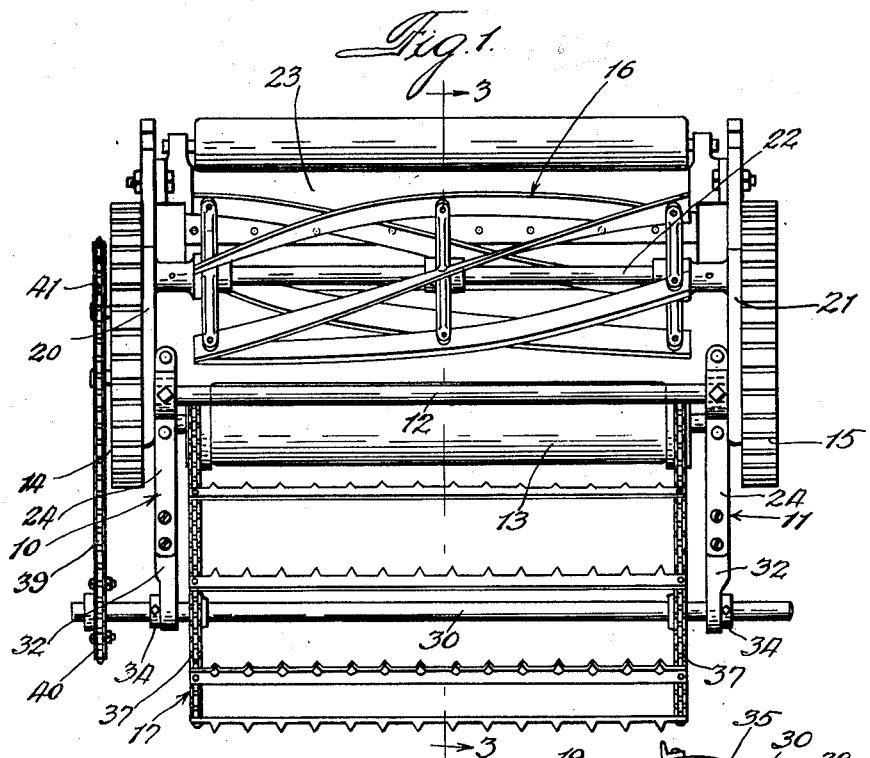
Inventor:
Daniel N Roundy
By Thiess, Olson & Mecklenburg Attys.

Patented Feb. 17, 1942

2,273,221

UNITED STATES PATENT OFFICE 2,273,221

LAWN MOWER ATTACHMENT

Daniel N. Roundy, Cheney, Kans.

Application August 4, 1940, Serial No. 351,351

7 Claims. (Cl. 56—249)

This invention relates to a lawn mower attachment and has special reference to a device for attachment to the forward end of a usual lawn mower for bending and directing tall grass, weeds, and the like to the rotary cutter of the lawn mower for cutting at a normal level in the regular cutting operation of the mower.

More particularly, this invention relates to the combination with a lawn mower of an attachment for directing relatively tall growths to the rotary cutter thereof comprising laterally spaced brackets fixed to the frame of the lawn mower and extending forwardly therefrom, there being a roller preferably supported by the brackets and disposed within the lateral confines of the spaced wheels of the mower adjacent the rotary cutter thereof. A reel is rotatably supported by the brackets outside of the lateral confines of the wheels and at an elevated position for co-operation with the roller in support of an endless conveyor therebetween, a driving connection between the wheels of the mower and the reel operating said endless conveyor.

Lawn mowers will not cut satisfactorily any tall growths of grass, weeds, or the like that extend in height above the axis or over half the diameter of the rotary cutter of the lawn mower. So far as applicant is aware there are no commercial lawn mowers having rotary cutters over six inches in diameter. It is, therefore, impractical or at least unsatisfactory to cut growths over three or four inches high with present day equipment of the usual type. The present invention contemplates the gathering in of growths over three inches high to be cut by the lawn mower concurrently with its regular operation.

The roller rotatably supported by the brackets secured to the frame of the lawn mower is disposed within the lateral confines of the wheels adjacent the rotary cutter thereof, the periphery of the roller at its lowermost point extending below the axis of the rotary cutter. The endless conveyor, supported between the roller and a reel disposed outside of the lateral confines of the wheels and at an elevated position with respect thereto, extends sufficiently high to engage the tops of tall growths of ordinary size to bend and direct the stalks thereof in a direction toward the rotary cutter closely adjacent thereto below the axis thereof.

Applicant is aware of prior inventions directed to the provision of a rotary rack or wheel for attachment with a lawn mower at a forward and elevated position with respect thereto, the rack or wheel being purported to direct tall grass and weeds to a position where the rotary cutter of the lawn mower can readily cut the same. In all such instances which have come to the attention of applicant the blades of the rotary racks or so-called beaters, in order that they reach the taller grasses, are elevated on an axis considerably above the axis of the usual rotary cutter of the mower so that the weeds are fed to the rotary cutter in a plane substantially above the axis thereof.

The present invention overcomes the objection to previous attachments for similar purposes in the provision of a rotary roller of relatively small diameter disposed adjacent the rotary cutter of the mower co-operating with a reel disposed at a substantially elevated position to support an endless conveyor in order that the tall growths are actually delivered to the cutter below the axis thereof. The speed of travel of the endless conveyor is approximately the same as that of the rotary cutter, the speed of travel of both rotary cutter and endless conveyor being substantially greater than that of the wheels of the mower.

One of the objects of this invention is to provide an attachment for a lawn mower of the character indicated above which is simple and efficient in operation, is comparatively inexpensive to manufacture, and is durable.

Another object of this invention is to provide an attachment for a lawn mower of the hereinabove referred to type wherein tall growths of grass, weeds or the like are directed to a position adjacent the rotary cutter and below the axis thereof.

Other objects and advantages of this invention will hereinafter be more particularly pointed out and, for a more complete understanding of the characteristic features of this invention, reference may now be had to the following description when taken together with the accompanying drawing, in which latter:

Figure 1 is a top plan view of the lawn mower attachment incorporating the features of this invention, the attachment being secured to a lawn mower of a usual type;

Fig. 2 is an end elevational view of Fig. 1;

Fig. 3 is a sectional view taken on the line 3—3 of Fig. 1; and

Fig. 4 is a side elevational view of the brackets for holding the attachment in position relative to the lawn mower.

Referring now more particularly to the drawing, the present invention has been illustrated as comprising laterally spaced brackets 10 and 11 fixed to a cross bar 12 of the frame of the lawn mower, the brackets being disposed between the wheels of the mower for extension forwardly therefrom. A roller 13 is rotatably supported by the brackets 10 and 11 and is disposed within the lateral confines of the wheels 14 and 15 of the mower adjacent the rotary cutter 16 thereof. A reel 17 is rotatably supported by the brackets 10 and 11 outside of the lateral confines of the wheels 14 and 15 and at an elevated position with respect thereto. The reel 17 and the roller 13 support thereon and therebetween an endless conveyor 18 and the conveyor, in turn, is operated by a driving connection 19 between the wheel 14 and the reel 17.

The lawn mower illustrated in the drawing is, as above stated, of the usual type comprising laterally spaced end frames 20 and 21 on which the wheels 14 and 15 are rotatably mounted. The wheels 14 and 15 are each provided with an internal gear for engaging a pinion on each end of a shaft 22 of the rotary cutter 16, the gear ratio being such that the cutter rotates considerably faster than the wheels. The blades of the rotary cutter 16 co-operate with a stationary blade 23 adjustably fixed between the frames 20 and 21 for cutting grass or other growths in the usual manner.

Each of the brackets 10 and 11 comprises an arm 24 having one end thereof formed into a split bearing 25 for receiving the cross bar 12 of the frame of the lawn mower, the arm being adjustably secured in position with respect to the cross bar 12 by an adjusting screw 26. If as shown in Fig. 3 of the drawing the cross bar 12 is of substantially small diameter a bushing 27 may be employed about which the bearing 25 may be clampingly engaged, the adjusting screw 26 extending through the bushing 27 for engagement with the cross bar 12.

A forked extension of the arm 24 provides spaced bearings 28 and 29 for receiving, respectively, the ends of shafts 30 and 31 of reel 17 and roller 13. The forked extension may, of course, be formed integrally with the arm 24 or, as shown in Fig. 4 of the drawing, may be in the form of separate brackets 32 and 33 secured as by means of bolts or the like to the arm 24. The shaft 30 supported in the bearings 28 of the brackets 10 and 11 are held against sidewise displacement by means of collars 34, the collars being removably fixed as by means of bolts to the shaft 31 and being disposed on the outside of the brackets 32.

Since the brackets 10 and 11 are mounted on the cross bar 12 in an adjustably fixed relation with respect thereto as by means of the bolts 26 and in this manner are pivotally secured to the cross bar 12, the bearings 28 and 29 are adjustably supported with respect to the lawn mower. In this connection it will be apparent that the roller 13 may be moved in a direction toward or away from the rotary cutter depending upon the size thereof so that the attachment may be embodied in lawn mowers of different sizes.

The reel 17 comprises a pair of spaced sprockets 35 fixedly secured to the shaft 30 for rotation therewith. Spaced chain-guiding sprockets 36 are mounted on the roller 13 for rotation therewith, an endless chain 37 being supported by and between each of the sprockets 35 and 36. A plurality of spaced and toothed cross bars 38 are supported on and between the endless chains to extend transversely to the lawn mower.

The endless conveyor is operated by a driving connection comprising an endless chain 39 supported on and between sprockets 40 and 41. The sprocket 40 is fixedly mounted on the shaft 30 of the reel and the sprocket 41 is secured to the shaft of the wheel 14.

In the operation of the lawn mower attachment, as the lawn mower is moved in a forwardly direction, the wheels 14 and 15 thereof through traction with the ground rotate the cutter 16. Co-operation of the blades of the cutter 16 with the stationary knife member 23 performs the usual cutting operation on growth not extending in height above the axis of the rotary cutter. In order to cut growths extending in height above the axis of the rotary cutter the reel 17, supported on brackets outside the lateral confines of the wheels 14 and 15 and at an elevated position with respect thereto, co-operates with a roller 13 disposed within the lateral confines of the wheels 14 and 15 closely adjacent the rotary cutter 16 to support an endless conveyor therebetween to bend the tall growths and direct them to the rotary cutter. The toothed cross bars of the conveyor actually engage the tall growths and, since the travel thereof is at a greater speed than the travel of the lawn mower, a bending of the growths in the direction of the rotary cutter is obtained. Also, since the toothed cross bars in the travel thereof pass around the roller 13, as shown more particularly in Fig. 3, the growths are bent below the axis of the cutter and may be cut in the regular manner thereby.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. The combination with a lawn mower having the usual frame, a pair of wheels supporting said frame, a rotary cutter on said frame, and a pair of oppositely disposed transversely aligned bearings on said frame, of laterally spaced brackets mounted for rotary adjustment on said bearings and extending forwardly therefrom, a roller rotatably supported by said brackets and disposed within the lateral confines of said wheels adjacent said rotary cutter, a reel supported by said brackets outside the lateral confines of said wheels and at an elevated position, a driving connection between said wheels and said reel, an endless conveyor supported on and between said roller and said reel and adjustable with said brackets, and means for locking said brackets in any adjusted position.

2. The combination with a lawn mower having a frame, a pair of oppositely disposed wheels on said frame, and a rotary cutter on said frame, of an attachment for directing relatively tall growths to the rotary cutter thereof, said attachment comprising laterally spaced brackets pivotally mounted on the frame of said mower and extending forwardly therefrom, a roller rotatably supported by said brackets and disposed within the lateral confines of the wheels of said mower adjacent the rotary cutter thereof, the lowermost periphery of said roller being below the axis of said cutter, a reel rotatably supported by said brackets outside of the lateral confines of said wheels and at an elevated position, a driving connection between said wheels and said reel, an endless conveyor supported on and between said roller and said reel, said attachment being adjustable rotarially about said bracket pivots, and means for securing said attachment in any adjusted position.

3. The combination with a lawn mower having a frame, a pair of oppositely disposed wheels on said frame, and a rotary cutter on said frame, of an attachment for directing relatively tall growths to the rotary cutter thereof, said attachment comprising laterally spaced brackets adjustably secured to the frame of said mower and extending forwardly therefrom, a roller rotatably supported by said brackets and disposed within the lateral confines of the wheels of said mower adjacent the rotary cutter thereof, said adjustable bracket predetermining the relation between said cutter and roller, a reel rotatably supported by said brackets outside of the lateral confines of said wheels and at an elevated position, a driving connection between said wheels and said reel, an endless conveyor supported on and between said roller and said reel, and means for locking said brackets in any adjusted position.

4. The combination with a lawn mower having a frame, a pair of oppositely disposed wheels on said frame, and a rotary cutter on said frame, of an attachment for directing relatively tall growths to the rotary cutter thereof, said attachment comprising laterally spaced brackets secured to the frame of said mower and extending forwardly therefrom, each of said brackets comprising an arm pivotally secured to a cross support of said mower frame for adjustment into fixed predetermined positions and a forked extension of said arm providing spaced bearings, a roller rotatably supported in one of said bearings and disposed within the lateral confines of the wheels of said mower adjacent the rotary cutter thereof, a reel rotatably supported in the other of said bearings outside of the lateral confines of said wheels and at an elevated position, said brackets predetermining the position of said reel and roller, a driving connection between said wheels and said reel, an endless conveyor supported on and between said roller and said reel, and means for locking said brackets in any adjusted position.

5. The combination with a lawn mower having a frame, a pair of oppositely disposed wheels on said frame, and a rotary cutter on said frame, of an attachment for directing relatively tall growth to the rotary cutter thereof, said attachment comprising laterally spaced brackets fixed to the frame of said mower and extending forwardly therefrom, a roller rotatably supported by said brackets and disposed within the lateral confines of the wheels of said mower adjacent the rotary cutter thereof, the lowermost periphery of said roller being below the axis of said cutter, a reel rotatably supported by said brackets outside of the lateral confines of said wheels and at an elevated position to extend above the vertical plane thereof, the diameter of said reel being substantially greater than the diameter of said roller, a driving connection between said wheels and said reel, and an endless conveyor supported on and between said roller and said reel.

6. The combination with a lawn mower having the usual frame, rotor with peripheral cutters thereon, fixed blade, and a transverse rod forming a part of said frame and positioned above and in front of said rotor, of a pair of spaced forwardly and downwardly extending brackets mounted for rotary adjustment on said rod, a transverse shaft on the forwardly extending portions of said brackets, a transverse shaft mounted on the downwardly extending portions of said brackets, an endless conveyor-like skeleton beater operatively mounted on said shafts and bodily adjustable with said brackets toward and from said rotor, said beater including spaced transverse flights movable upwardly closely adjacent said rotor cutters and in the opposite direction, a transmission between said rotary cutter and said conveyor and adapted to continuously operate said beater in any normal position of adjustment at a materially greater speed than the peripheral speed of said rotary cutter, and means to lock said beater assembly in adjusted position.

7. In a lawn mower having the usual cutter rotor with peripheral cutters thereon and a fixed blade cooperating with said cutters, an endless conveyor-like skeleton beater supported on the frame of said mower and extending angularly upwardly and forwardly from closely adjacent the path of said rotor cutters, said beater comprising transverse spaced flights mounted on suitable supports so that said flights move in a short radius arc around an axis closely adjacent said rotor with the lower span of said conveyor extending below the axis of said rotor, and a transmission between said rotor and said conveyor so that adjacent cutters and flights move in opposite directions and said flights move at a materially greater speed than said cutters.

DANIEL N. ROUNDY.